Patented Sept. 3, 1935

2,013,336

UNITED STATES PATENT OFFICE 2,013,336

PROTECTIVE COATING COMPOSITION

Robert D. Bonney, Glen Ridge, and Walter S. Egge, West Orange, N. J., assignors to Congoleum-Nairn Inc., a corporation of New York No Drawing. Application June 30, 1934,
Serial No. 733,307

7 Claims. (Cl. 134—17)

The present invention relates to protective coating compositions and more particularly to protective coating compositions comprising chlorinated rubber as one component of the base or vehicle and a specially prepared and treated drying oil product as another component of the base or vehicle.

Drying and semi-drying oils have long been used as the base or vehicle for a wide variety of paints, enamels, varnishes, and other protective coatings. Such compositions are characterized by their cheapness, the ease with which they may be applied, and the elasticity of the films formed therefrom. However they are not resistant to the action of alkalies or powerful solvents and require very considerable time to properly dry and harden. More recently, a product known as chlorinated rubber has been developed which offers a number of advantages as a vehicle for protective coating compositions although, at the same time, it possesses several marked disadvantages. Thus, chlorinated rubber compositions dry quickly, are highly resistant to strong re-agents both acid and alkali, are non-inflammable and non-combustible, have a high insulating value, and are unaffected by alcohols, petroleum solvents and mineral oils. Offsetting these advantages, however, are the disadvantages of extreme brittleness, relatively poor working qualities, and very poor adhesion to metal and wood surfaces. In order to overcome the brittleness of chlorinated rubber films, numerous plasticizers and softening agents have been recommended. Among the substances which have been tried are linseed and chinawood oil either raw or heat bodied, dibutyl phthalate, and tricresyl phosphate. These plasticizers, in the form in which they have been used, are not resistant to chemicals and therefore that important advantage of chlorinated rubber is nullified to a marked degree by the addition of such substances. The chemical plasticizers such as dibutyl phthalate and tricresyl phosphate, although exerting a softening effect, do not improve the adhesion of the chlorinated rubber films to any extent. On the other hand, raw and heat bodied drying or semi-drying oils, while somewhat improving the adhesion of the films, do not do so to a satisfactory degree and as the film ages the oil becomes oxidized with resultant brittleness.

We have discovered that the inherent disadvantages of chlorinated rubber compositions may be overcome while preserving the important advantages thereof by incorporating with such chlorinated rubber substantial amounts of a component of drying or semi-drying oil separated from unoxidized and non-hardening constituents as hereinafter described. Broadly, our invention contemplates a novel type of protective coating composition having a base comprising as one component chlorinated rubber and as another component that component of an oxidized drying or semi-drying oil which after oxidation is in fluid phase, is separated from a substantial proportion of unoxidized oil constituents and non-hardening oil constituents, and is capable of hardening without further substantial oxidation. The base may also comprise natural or synthetic resins, gums, or the like. In the production of commercial products, this compound base is dissolved in suitable selected solvents and may be combined with pigments, fillers, dyes, etc., to form a wide variety of protective coating and moulded compositions. Our invention further contemplates the method of preparing such compositions and the ultimate compositions in hardened state and in film or other form.

Chlorinated rubber, constituting one of the essential ingredients of the protective coating composition of our invention may be either chlorinated raw rubber or chlorinated vulcanized rubber or mixtures thereof, both being contemplated as within the term "chlorinated rubber" as used herein. We prefer to employ as the chlorinated rubber component a product of high chlorine content. While several commercial chlorinated rubber products are available containing from 45% to 70%, by weight, of combined chlorine, those products having 65% to 70%, by weight, of chlorine are to be preferred as they are more soluble in coating solvents, more compatible with vegetable oils and, in general, yield solutions of lower viscosity. The chlorinated rubber, either raw or vulcanized, may be obtained from any source or may be produced in any suitable manner. Thus, for example, suitable chlorinated rubber may be produced from raw or vulcanized rubber by dissolving rubber in a solvent such as carbon tetrachloride which will be unaffected by chlorine, heating the solution to a temperature within a range of 80° to 110° C. and introducing chlorine into the heated solution. Where vulcanized rubber is treated the sulphur will be separated out by the chlorine. Various methods for the production of suitable chlorinated rubber are disclosed in the United States Patents Nos. 1,544,529, 1,544,530, 1,234,381, and 1,852,043. Highly chlorinated rubber is a yellowish white powder and is available commercially in viscosities ranging from 6 to 100 centipoises, the viscosity being determined on a 20%, by weight, solution in toluene with a capillary viscosimeter at 25° centigrate. Chlorinated rubber is non-inflammable, non-combustible and inert to many chemical re-agents. It is stable at all temperatures up to 100° C. It is soluble in coal tar hydro-carbons such as benzol, xylol, and toluol, in chlorinated hydro-carbons such as ethylene dichloride, carbon tetrachloride, chloroform, etc., and in amyl acetate, ethyl acetate, and butyl acetate. It is insoluble in water, alcohols petroleum solvents, and in mineral oil.

The oxidized oil component of the character above defined and which is incorporated with the chlorinated rubber in preparing the compound base is preferably prepared from linseed oil. Other drying or semi-drying oils such as perilla oil, soya bean oil, rubber seed oil, etc., may be used, and, in general, any drying or semi-drying oil which, upon oxidation, yields a substantial amount of the oxidized glycerides of linolic and/or linolenic acids in fluid phase, will be found satisfactory. The preferred method of preparing the oxidized oil component is typified by the following illustrative example:—

Linseed oil is heated to about 80° C. and a suitable drier, for instance, .04% cobalt linoleate is added. The oil at a temperature of approximately 80° C. is then blown with air or is aerated with an equivalent oxygen containing gas for 20 to 30 hours until it becomes very viscous. When a tested sample just fails to completely dissolve in ethyl ether the oxidation is discontinued. The batch is then cooled and treated to effect a separation of the unoxidized oil constituents and non-hardening oil constituents. This separation may be effected by subjecting the oxidized oil to selective extraction with a solvent capable of dissolving the above-mentioned constituents but possessing little, if any solvating action upon the oxidized but uncoagulated glycerides of linolic and/or linolenic acids which are the desirable constituents for the oil component of the protective coating composition of our invention. The preferred solvent is petroleum ether (boiling range 30° to 75° C.) and about three to four volumes thereof to one volume of the oxidized oil should be employed. Petroleum naphtha (boiling range 60° to 160° C.) may be used as an equivalent extracting solvent. The oxidized but uncoagulated constituents of the oil which are desirable ingredients of the coating composition form a lower layer while substantial proportions of the unoxidized and non-hardening oil constituents dissolve in the extracting solvent to form an upper layer. This upper layer is removed by decantation. The extraction process is preferably repeated two or three times to assure an adequate separation. The remaining portion of the oxidized oil in fluid phase is then subjected to low heat and preferably at reduced pressure to remove the last portions of the extracting solvent. For convenience in subsequent handling the desired constituents of the oxidized oil obtained by the oxidizing and separating treatment above described are dissolved in a suitable solvent such as toluol or xylol to provide a 60% to 80% solution.

It is to be noted that in the preparation of the drying oil component the oxidation of the oil is discontinued at or just before the point where the oxidized oil has commenced to coagulate to the gel or linoxyn phase. This point may be determined by the ethyl ether test. As long as no linoxyn is formed the constituents of the batch undergoing oxidation will dissolve completely in ethyl ether, but upon the formation of linoxyn a cloudy precipitate will appear in the sample tested Following the above described method the yield of oxidized but uncoagulated constituents of the oil which are in fluid phase and are the desirable ingredients of the oxidized oil component and of the coating composition (i. e., that portion of the oxidized oil soluble in ethyl ether but insoluble in petroleum ether) varies from 60% to 85% by weight of the oil after completion of the oxidizing treatment thereof. The percentage yield of the desired constituents of the oil may be somewhat increased by the addition to the oil prior to oxidation thereof of a small amount—.1% to 2.0%—of maleic acid (or maleic acid anhydride) or equivalent acidic substance difficultly volatile at processing temperatures. Such maleic acid may be added to the oil in a dry state or in solution in a solvent of which one example is acetone. The function of the maleic acid or equivalent acidic substance appears to be that of a catalytic agent, facilitating the oxidation of the oil by preventing coagulation of the oxidized glycerides formed in the oxidizing treatment.

The desired oxidized oil constituents constituting the oil component of the novel protective coating composition of our invention are constituents which are soluble in ethyl ether but insoluble in petroleum ether and comprise chiefly the oxidized glycerides of linolic and linolenic acids in fluid and uncoagulated phase. The unoxidized oil constituents which are not oxidized in the oxidizing treatment and are removed in the separation process are either constituents of the oil which are capable of being converted by the oxidizing treatment into a substance having the property of hardening, but were not so converted, such as the glycerides of linolic and linolenic acids, or they are constituents of the oil which are unoxidizable by such treatment or by contact with air and do not possess the property of hardening such as the glycerides of saturated fatty acids of which stearic and palmitic are examples. The non-hardening oil constituents include, in addition to the above-mentioned unoxidized glycerides of the saturated fatty acids, those oxidized oil constituents which do not possess the property of hardening even though oxidized, such as the oxidized glycerides of oleic acid. It is these unoxidized and non-hardening constituents of the oil normally present after completion of the oxidizing treatment which are removed to a substantial extent by the separation treatment above described.

The protective coating composition of our invention comprises as a compound base or vehicle the two components above described. These components may be mixed in widely varying proportions but the practical range will be found to be about 3 parts by weight of chlorinated rubber to 1 to 6 parts by weight of the prepared oxidized oil component. Below are given illustrative examples of typical protective coating compositions embodying our invention.

A

*Primer for metal*

| | Percent |
|---|---|
| Chlorinated rubber, 30 C. P. viscosity | 13 |
| Separated component of oxidized drying oil | 13 |
| Red lead | 34 |
| Xylol | 25 |
| Benzol | 15 |

B

Finishing coat

| | Percent |
|---|---|
| Chlorinated rubber, 30 C. P. viscosity | 11 |
| Separated component of oxidized drying oil | 13 |
| Titanium dioxide | 8 |
| Zinc oxide | 8 |
| Turpentine | 15 |
| Xylol | 35 |

C

Acid and alkali resisting clear varnish

| | Percent |
|---|---|
| Chlorinated rubber, 30 C. P. viscosity | 25 |
| Separated component of oxidized drying oil | 10 |
| Turpentine | 15 |
| Xylol | 50 |

D

Elastic finishing varnish

| | Percent |
|---|---|
| Chlorinated rubber, 30 C. P. viscosity | 16 |
| Separated component of oxidized drying oil | 24 |
| Tetralin | 6 |
| Toluol | 40 |
| Xylol | 14 |

It will be noted that the compositions of the above formulæ contain from 35 to 60% of non-volatile matter. The compositions are readily workable and are easily applied by brushing, spraying, or dipping. The resultant films air dry in about 30 minutes to provide tough, flexible, durable and strongly adherent coatings, markedly superior to heretofore known compositions having a chlorinated rubber base.

By way of indicating more clearly the superiority of the products of our invention a series of comparative tests has been made and the results recorded in the table given below.

Compositions, I, III, and V were prepared in accordance with the respective formulas "A", "C", and "D" set forth above. Compositions II, IV, and VI of comparable type for respectively equivalent purposes were formulated in accordance with current commercial practice as follows:—

II—Primer

| | Percent |
|---|---|
| Chlorinated, 30% C. P. viscosity | 16 |
| Raw linseed oil | 6 |
| Red lead | 34 |
| Thinner | 43 |

IV—Acid and alkali resisting varnish

| | Percent |
|---|---|
| Chlorinated rubber, 30% C. P. viscosity | 20 |
| Cumar | 6 |
| Dibutyl phthalate | 2 |
| Thinner | 72 |

VI—Elastic finishing varnish

| | Per cent |
|---|---|
| Chlorinated rubber, 30% C. P. viscosity | 20 |
| Bodied chinawood oil | 10 |
| Thinner | 70 |

In formulas II and VI, the thinners contained 8% of methyl cyclo hexanone to prevent separation of the oil constituent.

In conducting the comparative tests each composition was applied by spraying to a series of steel panels 4" x 8", in such a fashion that the metal was wholly encased. Each film was then tested for its alkali-resistance, acid resistance, flexibility, and adhesion. The alkali-resistance was determined by dipping a film coated panel in 1% caustic soda and noting the elapse of time until the film softened to a point where it was easily abraded when lightly rubbed with the finger-nail. The effect of the alkali solution in decreasing the adhesion of the film was also noted. The acid-resistance was determined by depositing a pool of 50% sulphuric acid on the film and noting the elapse of time before the film became softened to a point where it was easily abraded when lightly rubbed with the finger nail. The flexibility was determined by bending a panel over a ¼" mandril and observing the maximum angle of bend before cracking of the film occurred. The adhesion was ascertained by noting whether or not the film could be stripped from the metal panel, i. e., whether the film would break before stripping or could be stripped without breaking, and the degree of resistance to such stripping. The working qualities of each composition were judged by the property of the wet film to level out and to form a smooth glossy surface, and by the freedom of the dried film from lap marks, "orange peel" effects, etc. The table recording the results of the comparative tests is as follows:—

| Compositions | Flexibility | Adhesion | Alkali resistance (1% NaOH) | Acid resistance (50% H²SO⁴) | Working qualities spraying and brushing |
|---|---|---|---|---|---|
| Primers | Degrees | | | | |
| I | 90 | Excellent—cannot strip | 28 hrs.—no loss of adhesion | 24 hours | Good. |
| II | Less than 10 | Extremely poor—easily stripped. | In 18 hrs. film came off of metal. | 24 hours | Very poor. |
| Acid and alkali resisting varnishes | | | | | |
| III | 40 | Excellent—cannot strip | 7 days—adhesion very good | 7 days | Fair. |
| IV | 5 | Very poor—easily stripped | 7 days—film could be stripped from panel with ease. | 7 days | Poor. |
| Elastic finishing varnishes | | | | | |
| V | 180 | Excellent—cannot strip | 4½ hours | 6 hours | Very good. |
| VI | 10 | Very poor—easily stripped | 3 hours | 6 hours—film blistered. | Poor. |

As will be observed, the outstanding qualities of our improved protective coating composition include its excellent flexibility, its strong adherence to the sub-surface and its improved working qualities.

Although it is preferable that the amount of unoxidized and non-hardening oil constituents remaining in the desired oxidized oil component separated from oil which has been subjected to oxidation should be at a minimum, nevertheless the difficulty in securing in commercial operation a quantitative elimination of these constituents makes it inexpedient to render the separated oxidized oil component used as one component of the base entirely free therefrom. The advantages of this invention accrue from the elimination from that component of oxidized oil which is used as a component of the base of any substantial proportion of unoxidized and non-hardening oil constituents, very good results being obtainable when the separation is carried to such an extent that the separated component comprises about 90% or more of desirable oxidized constituents of the oil soluble in ethyl ether but insoluble in petroleum ether and the advantages of the invention become more pronounced as that percentage is increased.

As further defining the character of the oil, and as indicating the degree of oxidation and separation, we have found that the iodine value of the oxidized oil component separated from the particular constituents above-mentioned which are present in the drying or semi-drying oil which has been subjected to the oxidation is less than 105 and usually in a range of 80 to 90.

From the foregoing general description and illustrative examples of procedure in accordance with the principles of this invention, the important features and effects of this invention, which are inherent in such procedure and in the results thereof become apparent. One important feature is that the component of the base which is obtained from the oxidized drying or semi-drying oil is not merely oil which has been subjected to oxidizing treatment and has the usual complex composition resulting from oxidation of the oil but such component of the base is a component or fraction taken from the oxidized oil which has definite characteristics clearly distinguishing it in important respects from the oxidized oil. Thus, the oxidized oil component is taken from drying or semi-drying oil which has been subjected to oxidizing treatment which is preferably discontinued prior to substantial coagulation of the oxidized constituents of the oil and thereby limited substantially to the formation of uncoagulated products of oxidation. Also the oxidized oil component made and used in this invention is in fluid phase, is substantially free of uncoagulated products of oxidation such as linoxyn, has been separated from a substantial proportion and preferably a major proportion of unoxidized and non-hardening oil constituents which naturally occur in drying or semi-drying oil that has been subjected to oxidation, and is capable of hardening without further substantial oxidation.

As above pointed out the oxidized constituents of the oil which are desirable as ingredients of the oxidized oil component of the base for the protective coating composition are the oxidized glycerides of linolic and linolenic acids in fluid phase and uncoagulated. In this form these desirable oxidized constituents possess the quality of coagulating and hardening without substantial further oxidation and even without contact with air, and they are soluble in solvents commonly employed in coating compositions, and a coating comprising a solution thereof hardens rapidly upon evaporation of the solvents to form a tough and resilient film of a high distensibility. Furthermore, they are compatible with chlorinated rubber in a common solvent to such a high degree that coating compositions comprising such desirable oxidized constituents in fluid phase and chlorinated rubber can be successfully prepared and used even though the proportion of such oxidized oil constituents exceeds the proportion of the chlorinated rubber.

Various natural or synthetic resins or gums can be incorporated with the compound base vehicle if desired. In many cases such addition is unnecessary and frequently undesirable as the added resin or gum may partially nullify certain valuable properties of a vehicle comprising solely chlorinated rubber and the oxidized and separated oil component. Where a resin is included, however, as for the purpose of imparting some particular property to the ultimate composition it may be added, as in solution, directly to the oxidized oil component previously produced by oxidation and separation, or it may be added to the oil before oxidation. By adding the resin or gum to the oil before the oxidizing step, the resin or gum is conveniently incorporated in the base and the procedure makes possible the complete incorporation of synthetic resins which are otherwise difficultly compatible with the vehicle. In the subsequent separation treatment a major portion of the resin will be associated with the desirable oxidized oil constituents, i. e., those constituents soluble in ethyl ether but insoluble in petroleum ether.

References herein to oxidized drying or semi-drying oils are intended as references to a drying or semi-drying oil which was originally in substantially its natural state but which has been subjected while in that state to oxidizing treatment whereby more or less readily oxidizable constituents of the oil are oxidized but the constituents of the oil are not otherwise substantially changed, such oxidation treatment producing oxidized glycerides; and references herein to constituents (or components) of oxidized drying oil are intended as references to ingredients or parts of such an oxidized oil and are not references to compounds such as acids which may be derived from such oil only by treatment other than or additional to the oxidizing treatment. Thus, the fluid component of the oxidized drying oil will, as above pointed out, include oxidized glycerides of fatty acids and also unoxidized constituents, and in accordance with this invention various constituents may be removed from such fluid component such as unoxidized oil constituents and the non-hardening oil constituents. The fluid component containing a major proportion of oxidized glycerides and separated from the various undesirable constituents is a new and valuable vehicle for coatings regardless of whether other vehicles commonly employed in protective coatings are employed in conjunction therewith, and it is so described and claimed in co-pending application No. 576,206 filed November 19, 1931, but that fluid component so separated from undesirable constituents is peculiarly compatible with chlorinated rubber and when combined therewith produces the novel type of protective coating composition of unusual properties as above set forth and it is so claimed herein.

It is recognized that both raw and heat bodied drying and semi-drying oils have been used heretofore in small amounts as plasticizing and softening agents in chlorinated rubber compositions. The development, however, of a protective coating composition having as one major component chlorinated rubber and as another major component that component of an oxidized drying or semi-drying oil which after oxidation is in fluid phase, is separated from a substantial proportion of unoxidized and non-hardening oil constituents, and is capable of hardening without further substantial oxidation, is distinctly novel. It is in the development of such protective coatings and of compositions formed thereof or containing the same, and of the ultimate compositions in hardened state that the present inventors assert their pioneership.

We claim:

1. A composition comprising a homogeneous mixture of chlorinated rubber and that component of oxidized drying or semi-drying oil which, after the oxidation of the oil is in fluid phase, is separated from a substantial proportion of the unoxidized and non-hardening oil constituents of the oxidized oil, and is capable of hardening without further substantial oxidation.

2. A composition comprising a homogeneous mixture of chlorinated rubber, a resin, and that component of oxidized drying or semi-drying oil which, after the oxidation of the oil is in fluid phase, is separated from a substantial proportion of the unoxidized and non-hardening oil constituents of the oxidized oil, and is capable of hardening without further substantial oxidation.

3. A composition comprising chlorinated rubber and the fluid oxidized glycerides of linolic and linolenic acids of oxidized drying or semi-drying oil, separated from a substantial proportion of the unoxidized and non-hardening oil constituents of the oxidized oil.

4. A protective coating composition comprising chlorinated rubber; that component of oxidized drying or semi-drying oil which is in fluid phase after oxidation of the oil, is capable of hardening without further substantial oxidation, and is separated from a substantial proportion of the non-hardening oil constituents of the oxidized oil; and sufficient of a solvent for said component and chlorinated rubber to maintain the fluidity of the composition.

5. A protective coating composition comprising chlorinated rubber; that component of oxidized linseed oil which, after oxidation of the oil is in fluid phase, is separated from a substantial proportion of the unoxidized and non-hardening oil constituents of the oxidized oil, and is capable of hardening without further substantial oxidation; and sufficient of a solvent for said component and chlorinated rubber to maintain the fluidity of the composition.

6. A protective coating composition comprising a solution of chlorinated rubber and that component of oxidized drying or semi-drying oil which is in fluid phase after the oxidation of the oil, is capable of hardening without further substantial oxidation, and is separated from a substantial proportion of the unoxidized and non-hardening oil constituents of the oxidized oil.

7. A protective coating composition comprising chlorinated rubber, a component comprising the fluid oxidized glycerides of linolic and linolenic acids of oxidized drying or semi-drying oil, said component containing less than 10%, by weight on said oxidized glycerides, of the oil constituents soluble in petroleum ether; and a common solvent for said component and chlorinated rubber.

ROBERT D. BONNEY.
WALTER S. EGGE.